Figure 4:
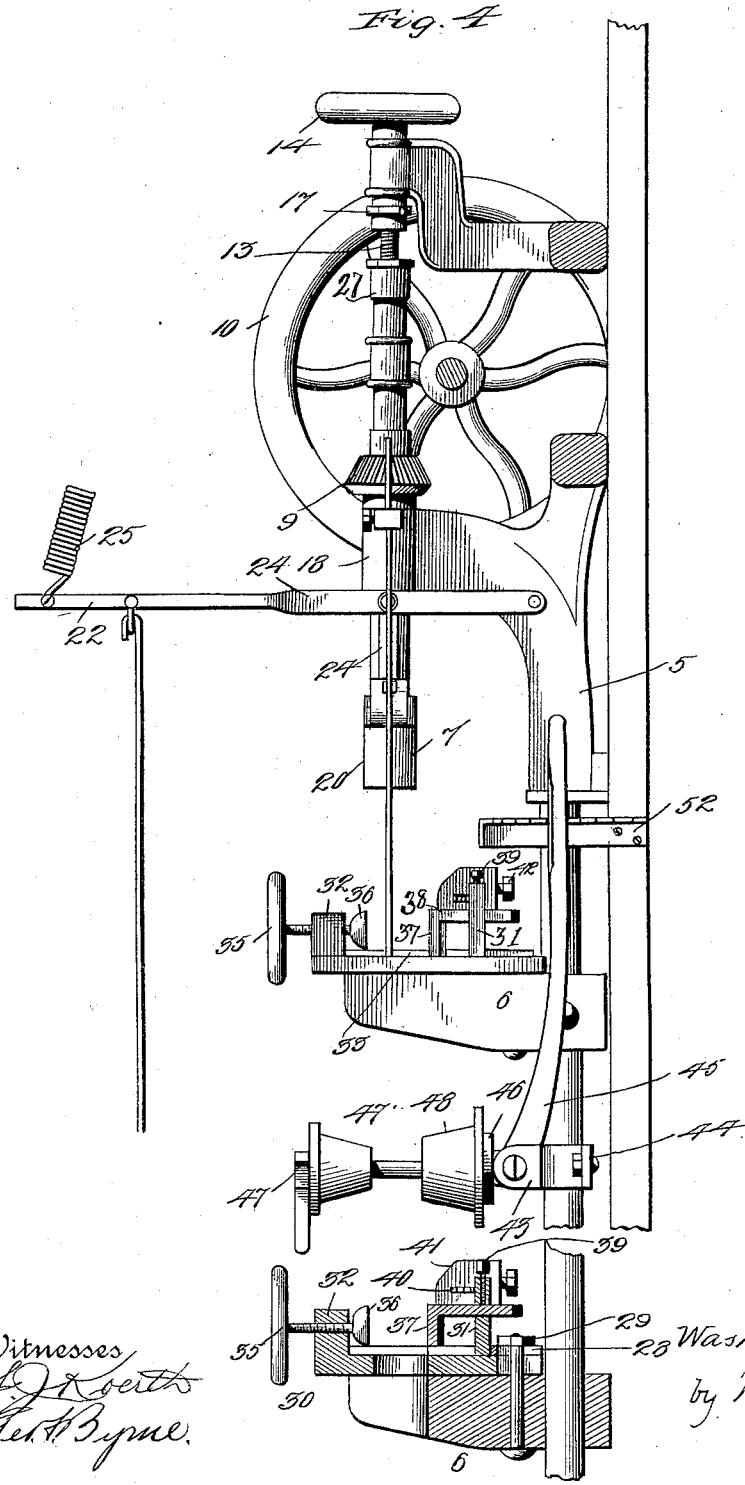

No. 613,008. Patented Oct. 25, 1898.
W. J. HUTSON.
BORING AND MORTISING MACHINE.
(Application filed Apr. 23, 1898.)
(No Model.) 2 Sheets—Sheet 1.
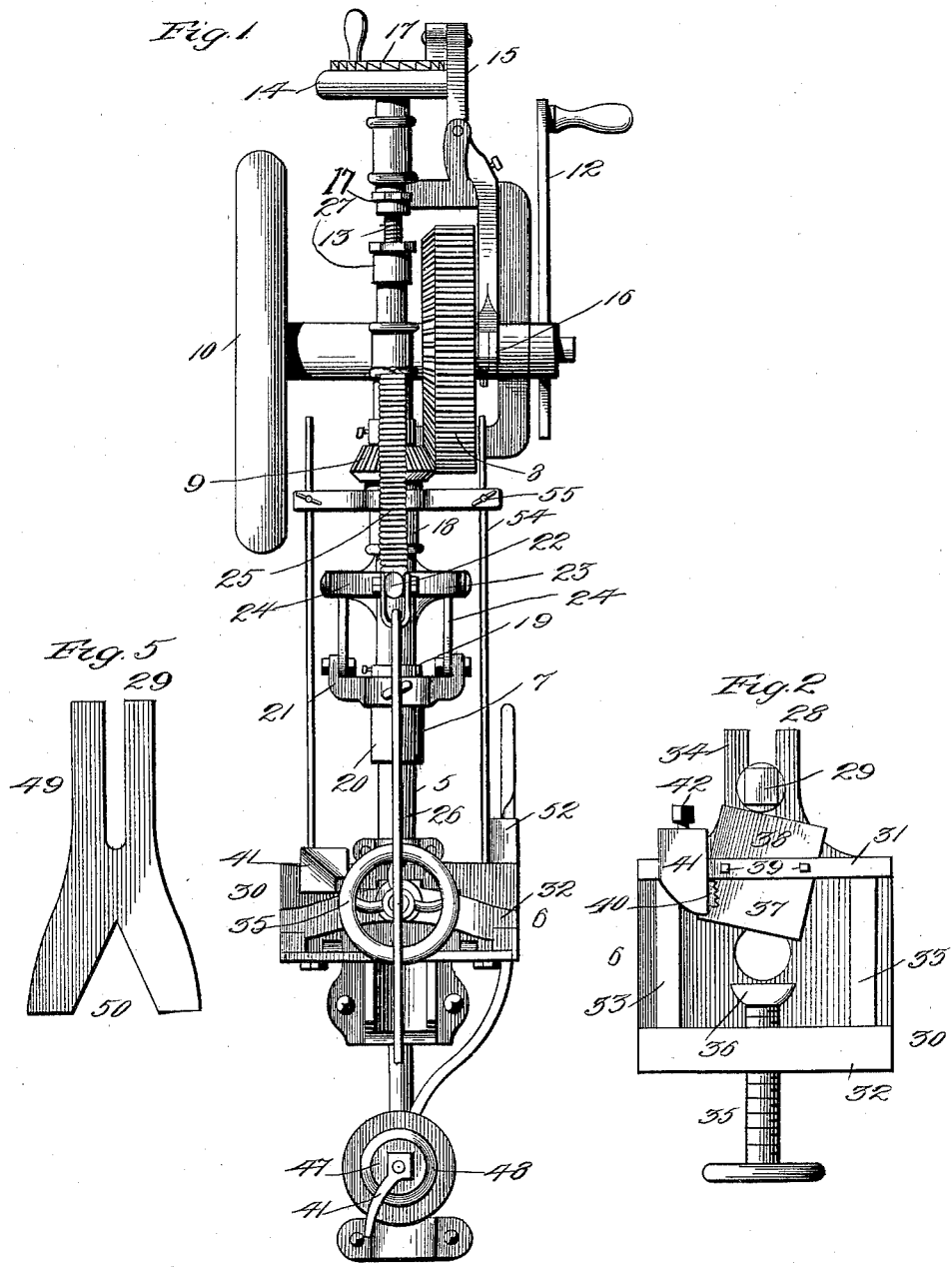
Witnesses:
Inventor
Washington J. Hutson
by W. C. Stevens.
Attorney
THE NORRIS PETERS CO., PHOTO-LITHO., WASHINGTON, D. C.

No. 613,008. Patented Oct. 25, 1898.
W. J. HUTSON.
BORING AND MORTISING MACHINE.
(Application filed Apr. 23, 1898.)

(No Model.) 2 Sheets—Sheet 2.

Witnesses
H. J. Koeth
Geo. H. Byrne.

Inventor
Washington J. Hutson
by W. X. Stevens
Attorney

THE NORRIS PETERS CO., PHOTO-LITHO., WASHINGTON, D. C.

UNITED STATES PATENT OFFICE.

WASHINGTON J. HUTSON, OF FLAT WOODS, TENNESSEE.

BORING AND MORTISING MACHINE.

SPECIFICATION forming part of Letters Patent No. 613,008, dated October 25, 1898.

Application filed April 23, 1898. Serial No. 678,618. (No model.)

*To all whom it may concern:*

Be it known that I, WASHINGTON J. HUTSON, a citizen of the United States, residing at Flat Woods, in the county of Wayne and State of Tennessee, have invented a new and useful Improvement in Boring and Mortising Machines; and I do hereby declare the following to be a full, clear, and exact description of the same, reference being had to the accompanying drawings, in which—

Figure I represents in front elevation a boring and mortising machine according to my invention. Fig. II is a plan or top view of a work-holding chuck belonging to this machine. Fig. III is a transverse vertical section of the chuck at the line x of Fig. II. Fig. IV is a side view of the machine, partly in vertical section, whereby the drill-driving gear and supporting-bracket are left out.
Fig. V is a top view of the forked rest in detail.

This invention relates in general to that class of combined machines which are designed for use in small shops instead of a number of separate machines to aid the mechanic in performing different parts of his work, and more particularly to machines adapted for the use of blacksmiths and wagon-makers; and its object is to provide a machine for drilling metals, for boring holes, spoke-tenons, and dowels, also for slicing and mortising wood.

To this end my invention consists in the construction and combination of parts forming a boring and mortising machine, hereinafter more fully described, and particularly pointed out in the claims.

5 represents the vertical post; 6, the work-table, fitted to be secured at any point thereon; 7, the spindle for carrying drills and other tools; 8, the drive-wheel; 9, the driven wheel, splined to the spindle to revolve the latter; 10, the balance-wheel on the drive-wheel shaft; 12, a crank fitted for attachment to the drive-wheel 8; 13, the feed-screw to advance the spindle in heavy work; 14, the nut and hand-wheel to operate the screw 13; 15, the feed-lever, actuated by the cam 16 on the shaft of the drive-wheel 8 to intermittently feed the hand-wheel 14 tooth by tooth and fitted to be thrown out of engagement by the operator.

17 is a head upon the sleeve of the nut 14 to keep it in the bearing of the frame.

All that has been thus far described is common.

Upon the spindle 7, below its lower bearing 18, I fix an adjustable collar 19, and between that and the spindle-head 20 I mount a yoke 21, in which the spindle rotates freely, but by which the spindle may be forcibly raised or lowered.

22 is a hand-lever pivoted at 23 to a fixture and connected by a pair of rods 24 with the two ends of the yoke 21.

25 is a balancing or return spring for the lever 22.

26 is a rod connecting with a foot-lever (not shown) for aiding the hand in heavy work.

The spindle 7 is connected with its feed-screw 13 by means of a coupling-nut 27, so that these parts may be disengaged to permit the spindle to be operated independently of the feed-screw.

28 is the bed-piece of a work-holding chuck, fitted to rest on the work-table 6 and having a hole to receive the bolt 29, by means of which it may be bound upon the table.

30 is the frame of the chuck, comprising a rear jaw 31, a front bar 32, two side bars 33, and a tang-piece 34, which is slotted to pass over the bolt 29.

35 is a hand-screw threaded through the front bar 32 and provided with a loose shoe 36 to rest against the work in clamping the same against the rear jaw 31.

37 is an adjustable jaw having a table portion 38, which is fitted through the rear jaw 31, through which two binding-screws 39 pass down upon the table 38, and the slot receiving this table 38 is so long as to permit the table to be turned and set at various angles in its horizontal plane, and the screws 39 are to hold the table when properly set.

40 is a spur fixed in a block 41, which is mounted for longitudinal adjustment on the rear jaw 31 and provided with a binding-screw 42 to engage that jaw.

43 is an arbor pivoted for vertical movement in a block 44 and provided with an elbow-lever handle 45. The block 44 may be mounted on the vertical post 5 when that is long enough, or it may be provided with a separate post in line of post 5 and supported on a fixture of the shop. The arbor 43 is screw-threaded and provided with a rear nut and collar 46 and with a wrench-nut 47 at its front end, by means of which two centering-cones 47' 48 may be located anywhere along the arbor to fit wheel-hubs and be bound into a hub to hold it firmly while the tenons on the outer ends of the spokes are being formed with a hollow auger by the boring-spindle 7. For steadying the spokes while the tenons are being thus formed a forked rest 49 (shown in Fig. V) is substituted for the chuck and bed-piece 28 and held in place on the table 6 by the bolt 29. For this purpose the bed-piece 28 may be raised on the bolt 29 and turned to one side and the forked rest 49 be inserted under the bed-piece. The slot 50 in the rear end of this rest permits it to be adjusted so that a spoke of any size may rest in its fork 51 and come central under the hollow auger.

52 is a toothed rack fixed on the machine-frame to engage the handle 45.

The operation is as follows: A hub may be held between the screw-plate 36 and the rear jaw 31 of the chuck while holes are bored in it for mortising. Then after a number of hubs have been bored a mortising-chisel may be secured in the spindle-head 20 and the same be vertically reciprocated by means of the hand-lever 22 and the foot-lever connected therewith by the rod 26, the spring 25 aiding in raising the chisel and levers and the whole chuck being slid back or forward, as required, for each new chip of the chisel, the bolt 29 being left a little free to permit the chuck to slide. The framework of a wagon may be bored and mortised by holding any piece thereof across the chuck against the rear jaw 31 and sliding the piece across the chuck for each new hole or chisel-cut. The spokes being usually purchased on the market with straight tenons formed at the hub ends may be sliced to the required edgewise taper by first adjusting the small table 38, with its jaw 37 projecting in front of the jaw 31, in the form of the tenon required, so that the slicing-ax when held in the head 21 will pass down by its front edge, like shears. Then set the block 41 so that its spur 40 will drive into the end of the spoke-tenon at the same time that the shoulder of the tenon abuts against the end 53 of the jaw 37, whereby each spoke may be quickly placed and held for slicing, so that all the tenons shall be exactly alike from any one setting of the jaw 37. After the spokes are driven into the hubs the hub is to be placed upon the arbor 43 and adjusted between the cones 47 48 to bring the outer ends of the spokes into proper relation to a hollow auger held in the head 20. Then the forked rest 49 is to be adjusted so as to steady the spoke to be tenoned, when the lever 45 is to be pushed back and held by the rack 52 while work is being done on the spoke-tenon by the hollow auger and boring-machine. On the completion of each spoke-tenon the handle 45 is to be released from the rack 52 and pulled forward, thus tripping the hub and bringing the finished spoke out of the fork 51. Now the wheel is to be rotated on the arbor 43 to bring up another spoke, when pushing back the handle will force that spoke into the fork 51 ready to be tenoned.

A collar 53 is provided with a set-screw and made adjustable along the spindle to abut against the bearing 18 and stop the descent of the spindle at the point where the spoke-tenon has been made long enough.

54 54 are stop-rods to be fixed by means of binding-screws in a cross-bar 55 to press down upon timbers to hold them while being bored or mortised.

The slide-bars 33 of the chuck slant inward a little to form a true bearing for fellies to insure their being bored radially. The spindle may be rotated by either hand or machine power. Disengaging the feed-screw 13 permits the spindle to be pressed down by the lever for quick work, also permitting the wood-boring augers to follow their own lead-screws.

This machine is peculiarly adapted to the wants of the many blacksmiths and wagon-makers scattered over the country as an aid in doing accurately and rapidly the work of various kinds above described.

In many shops space is so valuable that the combining of a number of machines in one largely increases the value of this one, and yet the cost of such a combination is very much less than the cost of a number of machines, each of which would do only a part of the work done by this one.

Having thus fully described my invention, what I believe to be new, and desire to secure by Letters Patent, is the following:

1. In boring and mortising machines, a work-holding chuck having a front bar, two side bars, a rear jaw and a tang-piece; the side bars having inward-slanting upper faces, and the rear jaw opposed by a hand-screw which is threaded through the front bar, substantially as described.

2. In boring and mortising machines, a work-holding chuck having a horizontally-slotted rear jaw; a smaller jaw having a table fitted into the said slot; binding-screws for the table, and a spur-block adjustably secured upon the said rear jaw, substantially as described.

3. In a boring and mortising machine, a spindle and a slicing-ax fitted thereto; a chuck fitted for adjustment transversely to the line of the spindle; a table fitted horizontally into the rear jaw of the chuck and having a jaw at its front edge fitted as a stationary shear-blade to which the said slicing-ax is the mate blade, substantially as described.

4. In a boring and mortising machine, a vertical spindle, a work-table and a post; a forked spoke-rest fitted to the table; a hub-arbor having a lever-handle and pivoted to a fixture in line of the said post, and a toothed rack located to be engaged by the said handle, substantially as described, whereby a wheel-hub having spokes in it may be firmly secured with a spoke resting in the said forked rest, or the hub and spokes may be bodily swung away from the said fork to permit rotating the hub and spokes.

In testimony whereof I affix my signature in presence of two witnesses.

WASHINGTON J. HUTSON.

Witnesses:
JOHN L. BURNETT,
GEO. A. BROOKS.